United States Patent
Edge et al.

(10) Patent No.: US 7,900,144 B1
(45) Date of Patent: Mar. 1, 2011

(54) MODIFICATION OF COLOR VALUES IN PAGE DESCRIPTION FILES

(75) Inventors: Christopher J. Edge, St. Paul, MN (US); William A. Rozzi, Stillwater, MN (US); Timothy A. Fischer, Mendota Heights, MN (US)

(73) Assignee: Eastman Kodak Company, Rochester, NY (US)

( * ) Notice: Subject to any disclaimer, the term of this patent is extended or adjusted under 35 U.S.C. 154(b) by 1275 days.

(21) Appl. No.: 09/534,824

(22) Filed: Mar. 23, 2000

(51) Int. Cl.
*G06F 17/00* (2006.01)
*G06K 15/00* (2006.01)

(52) U.S. Cl. ............ 715/276; 715/275; 358/1.1; 358/1.9; 345/589; 345/597

(58) Field of Classification Search .......... 715/528, 715/526, 275, 276, 273; 345/423, 428, 589, 345/597, 601, 604; 358/1.1, 1.9
See application file for complete search history.

(56) References Cited

U.S. PATENT DOCUMENTS

| | | | | |
|---|---|---|---|---|
| 4,760,460 A * | 7/1988 | Shimotohno | ............ | 358/426.01 |
| 5,542,052 A | 7/1996 | Deutsch | ............ | 345/589 |
| 5,659,638 A * | 8/1997 | Bengtson | ............ | 382/299 |
| 5,835,099 A * | 11/1998 | Marimont | ............ | 345/591 |
| 5,926,185 A | 7/1999 | Vyncke et al. | ............ | 345/619 |
| 6,034,700 A | 3/2000 | Rumph et al. | ............ | 345/441 |
| 6,449,053 B2 * | 9/2002 | Bando | ............ | 358/1.15 |
| 6,583,890 B1 * | 6/2003 | Mastie et al. | ............ | 358/1.18 |
| 6,594,030 B1 * | 7/2003 | Ahlstrom et al. | ............ | 358/1.15 |
| 6,784,896 B1 * | 8/2004 | Perani et al. | ............ | 345/589 |
| 6,879,327 B1 * | 4/2005 | Mathur et al. | ............ | 345/589 |
| 6,985,260 B1 * | 1/2006 | Ozawa | ............ | 358/3.26 |
| 7,304,648 B2 * | 12/2007 | Beaumont et al. | ............ | 345/589 |
| 7,433,103 B2 * | 10/2008 | Edge | ............ | 358/518 |
| 7,440,132 B2 * | 10/2008 | Foehr et al. | ............ | 358/1.18 |
| 2005/0243345 A1 * | 11/2005 | Foehr et al. | ............ | 358/1.9 |

OTHER PUBLICATIONS

Bagley et al., "Creating Reusable Well-Structured PDF as a Sequence of Component Object Graphic (COG) Elements", proceedings of the 2003 ACM symposium on document engineering published by ACM, Nov. 2003, pp. 58-67.*

IBM Technical Disclosure Bulletin, Concurrent PostScript Rasterizers Based High Throughput Color Printer Architecture, document ID. NN9703141, Mar. 1997, vol. 40, Issue 3, pp. 1-2.*

(Continued)

*Primary Examiner* — Adam L Basehoar
(74) *Attorney, Agent, or Firm* — Nelson Adrian Blish

(57) ABSTRACT

Modification of color values in a page description file can be carried out by converting implicit color commands within the page description file to explicit color commands. The color values specified by the explicit color commands within the page description file then are adjusted to calibrate an output device for enhanced color fidelity. Implicit color commands specify color values indirectly, for example, by defining color as a function of other graphic information and color reference values. Consequently, color modification prior to RIP conversion generally is difficult. Conversion and modification of explicit color values provides a higher degree of color conversion accuracy without the need for RIP conversion of the page description file.

15 Claims, 2 Drawing Sheets

OTHER PUBLICATIONS

Portable Document Format, Reference Manual, Version 1.3 Adobe Systems, Section 4.6.3 Shading Patterns:
ISO/CD 12639, Graphic Technology—Prepress digital data exchange—Tag image file format for image technology (TIFF/IT), sponsored by the ISO working group ISO TC130/WG2 N 480.
International Color Consortium, "ICC Profile Format Specification," Version 3.3, Nov. 11, 1996.
ColorSync—"Apple's Color Management Software White Paper" Michael Hopwood, Product Manager, Nov. 23, 1993.
ScenicSoft Trapwise software manual description.
RamPage software manual description.
BatchMatcher software manual description.
ColorBlind Parachute software manual description.
Adobe Illustrator 8.0, (Help Section) "Using Gradients, Blends, and Patterns," Changing gradients, blends and patterns into filled objects, pp. 1-2.

* cited by examiner

MODIFICATION OF COLOR VALUES IN PAGE DESCRIPTION FILES

TECHNICAL FIELD

The present invention relates to digital color imaging and, more particularly, to modification of color values in page description files.

BACKGROUND

Digital color imaging involves the reproduction of individual colors using combinations of colors such as cyan, magenta, yellow, and black (CMYK) in the case of typical hard copy printers, or red, green, and blue (RGB) in the case of typical display monitors. To provide accurate color reproduction, the input color values provided to the output device must be precisely controlled. The color outputs of two different printers may differ significantly for identical input color values. Similarly, common input color values may produce different color outputs for a monitor and a printer. For this reason, the color input data often is modified, or "corrected," using device calibration data to produce consistent color output from device to device. Modification of the input color values, in effect, modifies the drive values for the output device to compensate for colorimetric differences between different output devices. Color transformation is commonly used to achieve consistent color appearance, and involves pixel-based alteration of image data, e.g., CMYK-> C'M'Y'K', to simulate the output of a reference device.

Color images typically are defined by page description files. A page description language (PDL), such as Adobe™ PostScript™, permits the definition of pages using complex commands and subroutines to create graphic objects. A page description format, such as Adobe's Portable Document Format (PDF), provides a file format for consistent geometric appearance of an image on different output devices. In each case, the page description file contains commands that specify particular color values and associate them with pixels within the image to be reproduced. A raster image processor (RIP) converts the page description file to a bitmapped pixel image. A hardware RIP may be built into the output device or provided as a separate component. For some devices, the RIP is software-based. The pixel image contains the input color values that drive an output device such as a hard copy printer or a display monitor. The pixel image provides the explicit data necessary to drive the output device, while the page description file contains implicit commands for generation of the explicit data by RIP conversion.

SUMMARY

The present invention is directed to modification of color values in a page description file. In particular, the present invention provides a method, system, and computer-readable medium that permit modification of explicit color values specified by implicit color commands in page description files to provide enhanced color fidelity. Implicit color commands specify color values indirectly, for example, by defining color as a function of other graphic information and color reference values. The present invention enables modification of the explicit color values, providing a higher degree of color conversion accuracy. Modification can be achieved without the need for full RIP conversion of the page description file.

A "blend" is an example of an implicit color command. A "blend" may specify first and second endpoint color values, and define a shading function that generates intermediate color values ranging between the endpoint values based on pixel position. In this manner, a "blend" command may call for generation of several intermediate color values, but explicitly define only the endpoint values. Consequently, the intermediate color values are implicit within the page description file, and cannot be readily modified prior to RIP conversion. Modification of only the endpoint values does not take into account nonlinearities in the way different devices render color in the intermediate range, and therefore produces color fidelity that is generally unsatisfactory.

Conversion of the page description file prior to color modification can enhance color fidelity. The present invention, in some embodiments, converts implicit color commands within the page description file to explicit color commands, and modifies color values specified by the explicit color commands within the page description file. In this manner, the present invention permits modification of the color values implicitly defined in the page description file. Conversion of the page description file may take place by user selection of a conversion module, or by sending the file to a virtual printer or color server that performs the conversion and then sends the file to an actual printer for RIP conversion and printing.

In one embodiment, the present invention provides a method for modification of color values in a page description file, the method comprising identifying implicit color commands within the page description file, and converting the implicit color commands within the page description file to explicit color commands.

In another embodiment, the present invention provides a computer-implemented system for modification of color values in a page description file, the system comprising a processor that is programmed to identify implicit color commands within the page description file; and convert the implicit color commands within the page description file to explicit color commands.

In a further embodiment, the present invention provides a computer-readable medium storing program code that upon execution by a processor identifies implicit color commands within the page description file, and converts implicit color commands within the page description file to explicit color commands.

In an added embodiment, the present invention provides a method for modification of color values in a page description file, the method comprising identifying implicit color commands within the page description file, and converting each of the implicit color commands within the page description file to a plurality of implicit color sub-commands, wherein each of the implicit color commands pertains to a spatial area, and each of the implicit color sub-commands pertains to a sub-section within the spatial area.

In another embodiment, the present provides a computer-implemented system for modification of color values in a page description file, the system comprising a processor that is programmed to identify implicit color commands within the page description file, and convert each of the implicit color commands within the page description file to a plurality of implicit color sub-commands, wherein each of the implicit color commands pertains to a spatial area, and each of the implicit color sub-commands pertains to a sub-section within the spatial area.

According to another embodiment, the present invention provides a computer-readable medium storing program code that upon execution by a processor identifies implicit color commands within the page description file, and converts each of the implicit color commands within the page description file to a plurality of implicit color sub-commands, wherein each of the implicit color commands pertains to a spatial area, and each of the implicit color sub-commands pertains to a sub-section within the spatial area.

In an additional embodiment, the present invention provides a method for modification of color values in a page description file, the method comprising accessing implicit color commands within the page description file, and modifying explicit color values specified by the implicit color commands within the page description file without RIP-converting the page description file.

In a further embodiment, the present invention provides a computer-implemented system for modification of color values in a page description file, the system comprising a processor that is programmed to access implicit color commands within the page description file, and modify explicit color values specified by the implicit color commands within the page description file without RIP-converting the page description file.

In another embodiment, the present invention provides a computer-readable medium storing program code that upon execution by a processor accesses implicit color commands within the page description file, and modifies explicit color values specified by the implicit color commands within the page description file without RIP-converting the page description file.

Other advantages, features, and embodiments of the present invention will become apparent from the following detailed description and claims.

BRIEF DESCRIPTION OF THE DRAWINGS

Like reference numbers and designations in the various drawings indicate like elements.

DETAILED DESCRIPTION

Figure 1:
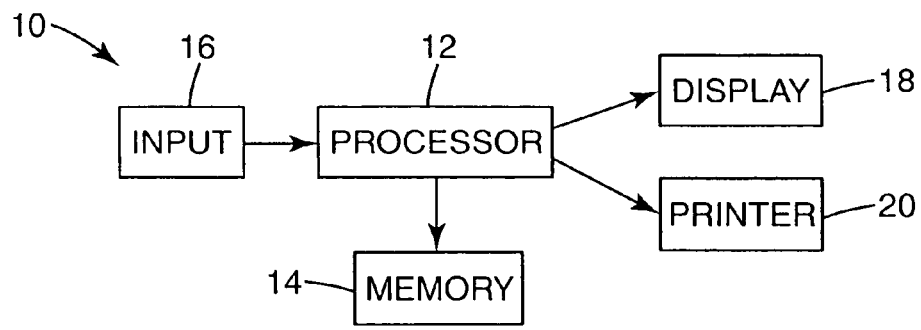
FIG. 1 is a block diagram illustrating a system for modification of color values in page description files.

FIG. 1 is a block diagram of a system 10 for modification of color values in page description files in accordance with an embodiment of the present invention. System 10 may be suitable for implementation of a method for modification of color values in page description files as described herein. As shown in FIG. 1, system 10 may include a processor 12, memory 14, an input device 16, and one or more output devices in the form of display monitor 18, and hard copy printer 20. Memory 14 may include random access memory (RAM) storing program code that is accessed and executed by processor 12. The program code can be loaded into memory 14 from another memory device, such as a fixed hard drive or removable media device associated with system 10. In particular, the program code can be initially carried on computer-readable media such as magnetic, optical, magneto-optic or other disk or tape media, or electronic media such as EEPROM. Alternatively, the program code can be loaded into memory 14 by transmission from a remote data archive, e.g., via a local area network, wide area network, or global network such as the Internet.

Processor 12 may take the form of any conventional general purpose single- or multi-chip microprocessor or a special purpose microprocessor. For example, processor 12 may reside within a personal computer and belong to the PENTIUM® family of microprocessors manufactured by the Intel Corporation of Santa Clara, Calif. However, it should be understood that the invention can be implemented on computers based upon other processors, such as the MIPS® family of microprocessors from the Silicon Graphics Corporation, the POWERPC® family of microprocessors from both the Motorola Corporation and the IBM Corporation, the PRECISION ARCHITECTURE® family of microprocessors from the Hewlett-Packard Company, the SPARC® family of microprocessors from the Sun Microsystems Corporation, or the ALPHA® family of microprocessors from the Compaq Computer Corporation. Of course, implementations for Macintosh computers, from Apple Computer, of Cupertino, Calif., may find favor with many graphic arts users.

Input device 16 may include a conventional keyboard and pointing device such as a mouse or trackball, if desired, as well as speech recognition hardware and software or other input media. Display 18 may take the form of a CRT, flat panel, or other conventional display that provides text and/or graphic output to the user. Printer 20 may take the form of an inkjet, dye sublimation, electrographic, electrophotographic, photographic, thermographic, photothermographic, or other conventional hard copy printer. Other output media such as electronic paper are also contemplated. Further, processor 12, memory 14, input device 16, display 18, and printer 20 may be integrated with or form part of a personal computer or computer workstation, and may operate in a conventional operating system environment such as Windows®, Macintosh®, Unix™, or Linux®. To facilitate communication and sharing of image files between remote users, and downloading of program code as described above, this environment may be networked.

In operation, processor 12 receives a page description file from memory 14. The page description file may include page description language (PDL) commands that define an image for reproduction on display 18 or printer 20. Display 18 or printer 20 may include a built-in hardware RIP, or make use of a stand-alone hardware RIP, or software-based RIP. In each case, the RIP executes page description instructions and produces a bitmapped pixel image that drives monitor 18 or printer 20 to reproduce a multi-color image. Sources of commercially available RIPs include Adobe Systems Inc. and Harlequin Limited. Prior to application of the full RIP, it is desirable to modify color values within the page description file so that the pixel image, when executed by display 18 or printer 20, produces color output that substantially matches a desired reference output. The modification may take place by user selection of a modification module, or by sending the file to a virtual printer or color server that performs the modification. In some cases, the modified file can be stored in RAM and sent to an actual printer as the conversion takes place. By modifying color values within the page description file, processor 12 can produce a file that, when subject to full RIP conversion, produces a pixel image that compensates for device-dependent color deviation in display 18 or printer 20. In this manner, consistent visual output can be achieved from device to device.

Importantly, the desired modification can be made prior to full RIP conversion. Indeed, in many cases, processor 12 will not have access to the fully RIP-converted pixel image because the RIP may reside in display 18 or printer 20, or in a stand-alone color server or other destination or intermediate hardware device. For this reason, color modification in advance of full RIP conversion is desirable. At the same time, however, the content of the page description file is not conducive to color modification due to the presence of numerous implicit color commands. In one embodiment, however, processor 12 executes program code that facilitates color modification prior to full RIP conversion by converting the implicit color commands within the page description file to explicit color commands. In particular, processor 12 parses the contents of the page description file to identify color commands that provide only implicit definitions of color values, i.e., implicit color commands. For each implicit color command, processor 12 generates an explicit color command that approximates the intended function and content defined by the implicit command. Processor 12 then replaces the implicit color command within the page description file with the corresponding explicit color command prior to RIP conversion. At the same, however, implicit spatial commands can be left intact for RIP conversion. In other words, processor 12 converts the color aspects of implicit commands, but may retain the spatial aspects.

The implicit-to-explicit conversion process preferably continues until all implicit commands have been replaced with explicit commands that permit predictable color value modification. Conversion of implicit commands to explicit commands by processor 12 may involve reference to a conversion table. The conversion table maps specific implicit commands to corresponding explicit commands that produce an analogous visual output in terms of shape, position, contour, and color. Following conversion, processor 12 modifies the explicit color values within the page description file using a conventional conversion mechanism such as multi-dimensional color transformation. Alternatively, processor 12 may execute the color modification for each explicit color value as it is converted from an implicit color value. Processor 12 may make use of International Color Consortium (ICC) or other device profiles that characterize the color output of display 18 or printer 20. With implicit color commands converted to analogous explicit color commands in the same page description language, conventional server- and batch processor-based solutions should be capable of handling the modification.

Conceivably, some implicit commands may not be readily susceptible to conversion to explicit commands, either due to the nature of the command or a failure to recognize it during the conversion. In the former case, some implicit commands may simply be left intact for RIP conversion. In the latter case, recognition of unfamiliar commands may be a simple matter of updating the conversion table from time to time as new commands become supported by the page description language or applicable syntax is changed. In any event, the conversion and modification technique of system 10 ordinarily should be useful in converting a large number of implicit commands within a page description file, providing considerable color fidelity improvements.

Figure 2:
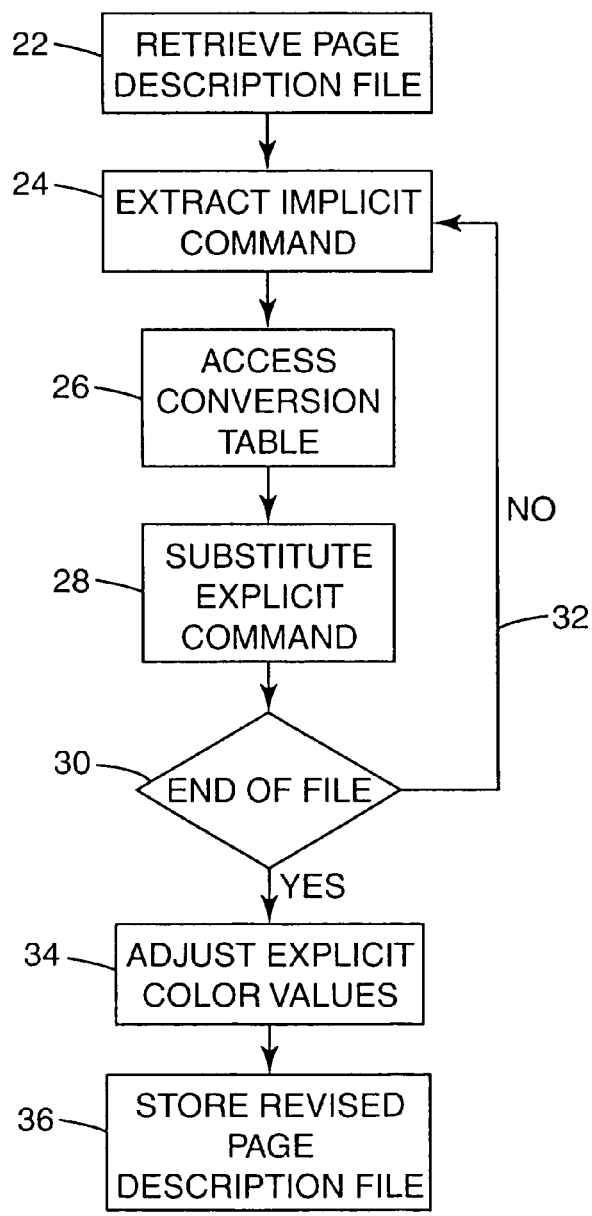
FIG. 2 is a flow diagram illustrating a method for modification of color values in a page description file.

FIG. 2 is a flow diagram illustrating a method for modification of color values in page description files, e.g., as implemented by system 10. As shown in FIG. 2, processor 12 retrieves a page description file from memory, as indicated by reference numeral 22. As indicated by reference numeral 24, processor 12 then initiates a parsing routine whereby commands identified as defining colors implicitly are extracted. A table of implicit commands can be loaded for comparison to aid in the identification process. Processor 12 then accesses a conversion table that maps the implicit commands to explicit commands, as indicated by reference numeral 26. The explicit command identified in the conversion table then is substituted for the implicit command, as indicated by reference numeral 28, and either held in a temporary file pending conclusion of the conversion routine or immediately written to the page description file. Alternatively, the file can be sent "on-the-fly" during the conversion to a device on a network, such as a printer, monitor, or color server. In other words, as each portion of the page description file is converted, it can be sent via the network to another device.

If the end of the page description file is not reached, as indicated by reference numeral 30, processor 12 searches for the next implicit command within the page description file, as indicated by reference numerals 32 and 24. If the end of the page description file has been reached, however, processor 12 may execute a color modification process that modifies the explicit color values in the file based on a profile for the output device to which the file will be transmitted, as indicated by reference numeral 34. Alternatively, processor 12 may send the file to another device via a network connection for modification of the explicit color values in the file. Notably, the color modification process modifies not only the explicit color values generated by conversion of the implicit color commands, but also the color values that were already explicitly defined in the page description file. Following color modification, processor 12 stores the revised page description file in memory 14, as indicated by reference numeral 36.

Figure 3:
FIG. 3 is a diagram of a graphic object defined by explicit color values.
Figure 4:
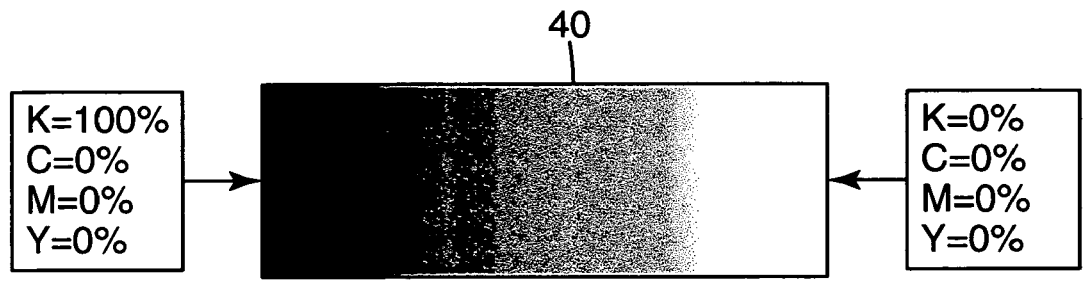
FIG. 4 is a diagram of a graphic object defined by implicit color values.
Figure 5:
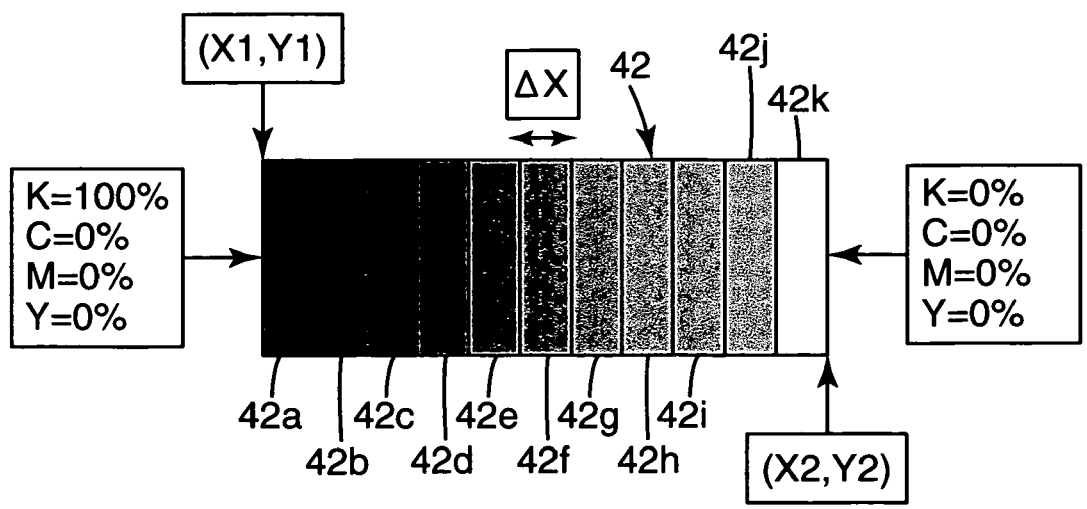
FIG. 5 is a diagram of a graphic object originally defined by implicit color values following conversion to a set of sub-objects defined by explicit color values.

To convert each implicit command, an explicit command or series of explicit commands that produce analogous visual output must be provided. Once a library of explicit commands has been developed for known implicit commands, it can be loaded into the conversion table in memory 14 and mapped to the implicit commands. FIGS. 3-5 illustrate conversion of an implicit command to an explicit command. FIG. 3 is a diagram of a graphic object defined by explicit color values. In particular, FIG. 3 shows an exemplary command that defines the coordinates and dimensions of a rectangle 38 within an image, as well as the unique values of RGB or CMYK for pixels filling the rectangle. In the example of FIG. 3, the color pixel values are explicitly defined in the command parameters for drawing and filling rectangle 38. Specifically, the command specifies a uniform color value, e.g., K=100% of full-tone, throughout rectangle 38. Thus, every pixel is assigned the same color value, i.e., C=0, M=0, Y=0, and K=100%. As a result, modification of the color values within rectangle 38 is very simple, and merely requires modification of the explicit color value assigned to the entire rectangle.

FIG. 4 is a diagram of a graphic object defined by implicit color values. In particular, like FIG. 3, FIG. 4 illustrates a rectangle 40 defined by coordinates and position within an image. In the example of FIG. 4, however, the color values assigned to pixels within rectangle 40 are implicitly defined. Rather than assigning a single color value to the pixels within the rectangle, the implicit command specifies a smooth shading function to fill rectangle 40. The smooth shading function requires a starting point color value, e.g., K=100%, at the left side of rectangle 40, and an ending point color value, e.g., C=0, M=0, Y=0, K=0%, at the right side of the rectangle. The smooth shading function then defines a uniform progression of color values for pixels extending from the left side to the right side of rectangle 40. In lieu of a smooth shading function with starting and ending point color values, the implicit command may specify a function or mathematical expression to define the change of color values as a function of spatial position. In either case, the precise intermediate values of the pixels within the rectangle of FIG. 4 will not be known, and therefore cannot be directly modified, until such time as the page description file is interpreted by a RIP or other interpreter.

Existing tools for color modification or "correction" of a page description file utilize color conversion technology such as ICC profiles and color matching modules to map original color values CMYK to new destination device values C'M'Y'K'. Commands such as those defining rectangle 40 of FIG. 4, however, are only color modified for the starting and ending point color values. Again, the intermediate color values for pixels within rectangle 40 are only calculated when the file is subject to RIP conversion, and therefore may not be correctly modified. Modification of only the starting and ending point color values fails to account for the effects of color channel interaction, e.g., nonlinearities in the way different devices render color in the intermediate range, particularly for different output media. Consequently, application of existing color management tools to implicitly defined page description commands generally produces inadequate color fidelity for the intermediate color values.

FIG. 5 is a diagram of a graphic object originally defined by implicit color values upon conversion to a set of sub-objects defined by explicit color values. The graphic object of FIG. 5 is a rectangle 42 that is generally equivalent to rectangle 40 of FIG. 4. In particular, rectangle 42 is filled with pixels having color values that, in effect, range from K1=100% at the left side to K2=0% at the right side according to a smooth shading function. As shown in FIG. 5, however, the implicit command defining the graphic object, i.e., rectangle 42, has been converted to explicit commands defining a set of sub-objects. Specifically, rectangle 42 as shown in FIG. 4 has been divided into a plurality of sub-rectangles 42a-42k, each of which is assigned an explicit color value based on the value of the smooth shading function at the position occupied by each sub-rectangle.

In the example of FIG. 5, rectangle 42 has been divided into eleven sub-rectangles 42a-42k, each of which is assigned an explicit color value. The number of sub-rectangles, or other objects as appropriate, may vary with the degree of precision required in color values at each pixel. Each sub-object theoretically could be the size of a single pixel. For most applications, however, the size of the sub-object may be determined according to the color transition function defined by the implicit command. An applicable function may assign a color value, for example, to a region of pixels based on common spatial position. Sub-rectangles 42a-42k, when RIP-converted and executed by an output device, preferably produce a visual output that very closely matches that of rectangle 40 of FIG. 4. At the same time, however, sub-rectangles 42a-42k permit ready modification of the intermediate color values that are explicitly defined for each sub-rectangle, and which extend from K1=100% for the left-most sub-rectangle to K2=0% for the right-most sub-rectangle.

The conversion of commands in an existing page description file to a new format, such as that shown in FIG. 5, permits accurate color conversion or color management using existing methods that involve replacement of color values within the file. An application executed by processor 12 parses the page description file content, e.g., PDL information, and converts all implicit color commands and programming modules into substantially equivalent explicit color commands. In the example of FIG. 5, the single smooth shade command applied to rectangle 40 of FIG. 4 can be converted into the multiple sub-rectangles 42a-42k, each of which has a uniform color value. The color values of sub-rectangles 42a-42k can change incrementally with position from 100% at one side to 0% at the other. Similar assignments of uniform color values can be made on the basis of position, e.g., from side-to-side, top-to-bottom, or on the basis of more complicated functions that divide an object into sub-components of different shapes or sizes. In any event, the resulting object is then characterized by a number of sub-components with explicit color assignments, rather than a larger object with only explicit starting and ending point color assignments and a function that implicitly defines intermediate colors.

To illustrate the conversion of an implicit color command to an explicit color command, reference is made to a set of pseudo-commands for converting the shaded rectangle 40 of FIG. 4 to a set of sub-rectangles 42a-42k as shown in FIG. 5. First, it is necessary to assume the existence of two simple implicit commands: DrawRect and DrawRectS. With further reference to FIG. 5, the DrawRect command is a command for drawing a rectangle filled with a single color pixel value C, M, Y, K from upper-left coordinates (X1, Y1) to lower right coordinates (X2, Y2). The format of the DrawRect command may be represented as follows:

DrawRect(X1,Y1,X2,Y2,C,M,Y,K)

where X1, Y1, X2, Y2 are the spatial coordinates of the rectangle and C, M, Y, K are the color pixel values for each colorant cyan, magenta, yellow, and black, in the case of a hard copy printer that makes use of such colorants.

The DrawRectS command is a command for drawing a rectangle with a smooth blend of values going from left to right. The format of the DrawRectS command can be represented as follows:

DrawRectS(X1,Y1,X2,Y2,C1,M1,Y1,K1,C2,M2,Y2,
K2,shadeFunction)

where X1, Y1, X2, Y2 are the spatial coordinates of the rectangle, C1, M1, Y1, K1 are the color values at the left endpoint of the rectangle, C2, M2, Y2, K2 are the color values at the right endpoint of the rectangle, and shadeFunction is either a parametric or lookup table description of how color values should vary with position within the rectangle. The shadeFunction function, for example, could be as follows:

shadeFunction=C1+(C2−C1)*(X−X1)/(X2−X1)

and similarly for Y, M, and K. In this case, shadeFunction is linear with coordinate X. Of course, other functions may be linear or nonlinear, and may vary with coordinate X, coordinate Y, or a combination of both.

Existing tools for color modification, or "correction," of a page description file would utilize color conversion technology such as ICC profiles and color matching modules to map the original colors CMYK to new destination device values C'M'Y'K'. Thus, in the implicit expressions above, the original values would be transformed and substituted back into the graphical expressions. For example, a new value C1' and M2' would be substituted for every occurrence of C1 and M2. The problem with such a solution is that commands such as DrawRectS( ) above would only be color modified for the endpoint values C1, M1, Y1, K1 and C2, M2, Y2, K2. The intermediate values would only be calculated when the page description file is RIP converted and sent to an output device. Consequently, such values may not be correctly modified.

To avoid this problem, the DrawRectS( ) command is modified and converted to a new series of individual sub-rectangle commands. For simplicity, the case of CMY=0 is considered so that reference to CMY values can be eliminated. In this example, only the value of K is subject to change. The DrawRectS( ) command with K ranging between endpoint values of K1 to K2 can be converted into a series of explicit DrawRect commands as follows:

```
DrawRect(X1, Y1, X1 + ΔX, Y2, K1)
DrawRect(X1 + ΔX, Y1, X1 + 2 * ΔX, Y2, K1 + ΔK)
DrawRect(X1 + 2 * ΔX, Y1, X1 + 3 * ΔX, Y2, K1 + 2 * ΔK)
 .
 .
 .
DrawRect(X1 + (N − 1) * ΔX, Y1, X1 + N * ΔX, Y2, K1 + (N − 1) * ΔK)
```

Thus, each rectangle is of the form:

DrawRect(X1+(i−1)*ΔX,Y1,X1+i*ΔX,Y2,K1+
(i−1)*ΔK)

for i=1 to N where N is the number of sub-rectangles to be drawn and $\Delta K = (K2 - K1)/(N-1)$ and $\Delta X = (X2 - X1)/(N-1)$.

In the above manner, a shaded rectangle having values of K that are implicitly defined can be converted to a series of rectangles having values of K that are explicitly enumerate and defined.

For even greater smoothness, the original shade rectangle can optionally be converted into a series of shaded rectangles, each having a spatial width −X and color range width −K. The color values of each rectangle can be explicitly defined with a certain range of tolerance, on the order of −K. Each of the resulting rectangles would be of the form:

DrawRectS(X1+(i−1)*ΔX,Y1,X1+i*ΔX,Y2,K1+
(i−1)* ΔK,K1+i*ΔK,shadeFunction)

In this case, existing techniques for color correction of the values in this series of rectangles should give improved accuracy while still allowing the RIP to improve smoothness through its high resolution mechanisms.

For page description files, programming could be employed to describe objects such as the simple rectangle case described with reference to FIG. 5. An example of converting graphic objects or sub-modules such as "Do Loops" that contain implicit color values to objects containing explicit values involves conversion of the expression to a list. A shaded rectangle described by a "For Loop" of the form:

For i=1 to N

DrawRect(X1+(i−1)*ΔX,Y1,X1+i*ΔX,Y2,K1+
(i−1)*ΔK), would result in objects having color values that are not explicitly defined, but rather calculated, albeit with a very simple calculation:

$K \text{ Value} = K1 + (i-1)*\Delta K$

To produce explicitly defined color values based on the above calculation, the expression could be converted to a list as follows:

$K \text{ Value} = K1$ $K \text{ Value} = K1 + \Delta K$ $K \text{ Value} = K1 + 2*\Delta K$ -continued $K \text{ Value} = K1 + 3*\Delta K$

⋮

$K \text{ Value} = K1 + (N-1)*\Delta K$

The above example contemplates the sub-division of a larger object, having color defined by an implicit command, into smaller objects with explicitly assigned colors. As an alternative, the smaller objects, themselves, could be assigned implicit color. Applying this approach to the example of FIG. 5, each sub-rectangle 42a-42k would be assigned an implicit shading function with start- and end-points assigned to the respective rectangle. In this case, pixels within each sub-rectangle 42a-42k have implicitly defined colors. The spatial distance between the start- and end-points for each sub-rectangle 42a-42k, and presumably the color difference, is much less than for the larger rectangle 40. As a result, modification applied to the multiple start- and end-point color values for sub-rectangles 42a-42k can be expected to produce more accurate results than modification of merely the two start- and end-point color values associated with rectangle 40.

Thus, according to this approach, the conversion of implicit color commands to explicit color commands is not a full conversion. Rather, in effect, the conversion results in the generation of multiple implicit sub-commands based on the original implicit command. In practice, this approach may permit the use of a lesser number of sub-rectangles because each sub-rectangle has a varying color values based on spatial position within the sub-rectangle, e.g., for a shading function. This is unlike the assignment of a single static color value to each sub-rectangle, where it may be desirable to employ much smaller sub-rectangles to avoid grouping large numbers of pixels into the same color value range for color modification. In either cases, however, the result is more accurate color modification and more consistent color appearance from device to device.

The foregoing detailed description has been provided for a better understanding of the invention and is for exemplary purposes only. Modifications may be apparent to those skilled in the art without deviating from the spirit and scope of the appended claims.

The invention claimed is:

1. A method for modification of color values in a page description file, the method comprising:
   identifying implicit color commands within the page description file;
   converting each of the implicit color commands within the page description file to a plurality of implicit color sub-commands such that the implicit color sub-commands replace the implicit color commands within the page description file; and
   modifying color values specified by the implicit color sub-commands,
   wherein each of the implicit color commands pertains to a spatial area, and each of the implicit color sub-commands pertains to a sub-section within the spatial area.

2. The method of claim 1, wherein converting the implicit color commands includes converting the implicit color commands without raster image processing the page description file.

3. The method of claim 1, wherein the conversion includes converting substantially all of the implicit color commands within the page description file to implicit color sub-commands.

4. The method of claim 1, wherein the conversion includes converting some of the implicit color commands within the page description file to implicit color sub-commands, and converting others of the implicit color commands to explicit color commands.

5. The method of claim 1, wherein the color values include cyan, magenta, yellow and black color values.

6. A computer-implemented system for modification of color values in a page description file, the system comprising a processor that is programmed to:
- identify implicit color commands within the page description file;
- convert each of the implicit color commands within the page description file to a plurality of implicit color sub-commands such that the implicit color sub-commands replace the implicit color commands within the page description file; and
- modify color values specified by the implicit color sub-commands,
- wherein each of the implicit color commands pertains to a spatial area, and each of the implicit color sub-commands pertains to a sub-section within the spatial area.

7. The system of claim 6, wherein converting the implicit color commands includes converting the implicit color commands without raster image processing the page description file.

8. The system of claim 6, wherein the conversion includes converting substantially all of the implicit color commands within the page description file to implicit color sub-commands.

9. The system of claim 6, wherein the conversion includes converting some of the implicit color commands within the page description file to implicit color sub-commands, and converting others of the implicit color commands to explicit color commands.

10. The system of claim 6, wherein the color values include cyan, magenta, yellow, and black color values.

11. A computer-readable medium storing program code that upon execution by a processor:
- identifies implicit color commands within the page description file;
- converts each of the implicit color commands within the page description file to a plurality of implicit color sub-commands such that the implicit color sub-commands replace the implicit color commands within the page description file; and
- modifies color values specified by the implicit color sub-commands,
- wherein each of the implicit color commands pertains to a spatial area, and each of the implicit color sub-commands pertains to a sub-section within the spatial area.

12. The computer-readable medium of claim 11, wherein the conversion of the implicit color commands includes converting the implicit color commands without raster image processing the page description file.

13. The computer-readable medium of claim 11, wherein the conversion includes converting substantially all of the implicit color commands within the page description file to implicit color sub-commands.

14. The computer-readable medium of claim 11, wherein the conversion includes converting some of the implicit color commands within the page description file to implicit color sub-commands, and converting others of the implicit color commands to explicit color commands.

15. The computer-readable medium of claim 11, wherein the color values include cyan, magenta, yellow, and black color values.

* * * * *